United States Patent
Wilde et al.

(10) Patent No.: US 7,654,733 B2
(45) Date of Patent: Feb. 2, 2010

(54) METHOD AND DEVICE FOR IDENTIFYING A TEMPERATURE SENSOR CONNECTED TO A CONTROL UNIT

(75) Inventors: Eugen Wilde, Knittlingen (DE); Wilfried Schilling, Kraichtal (DE)

(73) Assignee: E.G.O. Elektro-Geraetebau GmbH, Oberderdingen (DE)

(*) Notice: Subject to any disclaimer, the term of this patent is extended or adjusted under 35 U.S.C. 154(b) by 0 days.

(21) Appl. No.: 12/195,661

(22) Filed: Aug. 21, 2008

(65) Prior Publication Data
US 2009/0010302 A1 Jan. 8, 2009

Related U.S. Application Data

(63) Continuation of application No. PCT/EP2007/001652, filed on Feb. 27, 2007.

(30) Foreign Application Priority Data

Mar. 1, 2006 (DE) .................. 10 2006 010 107

(51) Int. Cl.
*G01K 15/00* (2006.01)
(52) U.S. Cl. .......................... 374/1; 374/183
(58) Field of Classification Search .............. 374/1, 374/183
See application file for complete search history.

(56) References Cited

U.S. PATENT DOCUMENTS

| | | | | |
|---|---|---|---|---|
| 4,531,842 A | * | 7/1985 | Schonberger | 374/1 |
| 4,901,257 A | * | 2/1990 | Chang et al. | 702/99 |
| 5,719,378 A | * | 2/1998 | Jackson et al. | 219/497 |
| 5,857,777 A | | 1/1999 | Schuh | |
| 6,007,239 A | * | 12/1999 | Nickol | 374/1 |
| 6,015,230 A | * | 1/2000 | Wantz et al. | 374/1 |
| 6,118,105 A | | 9/2000 | Berkcan et al. | |
| 6,155,711 A | * | 12/2000 | Schaupert et al. | 374/1 |
| 6,161,958 A | * | 12/2000 | Rattman et al. | 374/1 |

(Continued)

FOREIGN PATENT DOCUMENTS

DE 2445804 4/1976

(Continued)

OTHER PUBLICATIONS

International Search Report from PCT/EP2007/001652 dated Jun. 21, 2007.

(Continued)

*Primary Examiner*—Gail Verbitsky
*Assistant Examiner*—Mirellys Jagan
(74) *Attorney, Agent, or Firm*—Alston & Bird LLP

(57) ABSTRACT

A controller of a hob is connected to a temperature sensor of a radiation based heating element. In principle, two different groups of temperature sensors can be used, whose resistance values differ by approximately a factor of three. When the hob is first used, the resistance of the temperature sensor is measured at room temperature and is classified in one of the two groups of temperature sensors on the basis of a limit value between the two typical temperature profiles of the groups of temperature sensors. On the basis of this, calibration of the controller is carried out for the purpose of adjusting to the established group to which the temperature sensor belongs.

14 Claims, 1 Drawing Sheet

U.S. PATENT DOCUMENTS

| | | | |
|---|---|---|---|
| 6,824,308 B2 * | 11/2004 | Sumimoto et al. | 374/185 |
| 7,214,909 B2 | 5/2007 | Reiter et al. | |
| 2003/0183618 A1 | 10/2003 | Moreno | |
| 2006/0104330 A1 * | 5/2006 | Ho Limb et al. | 374/1 |
| 2006/0289460 A1 | 12/2006 | Thimm et al. | |

FOREIGN PATENT DOCUMENTS

| | | |
|---|---|---|
| DE | 102004035014 | 2/2006 |
| EP | 0740135 | 10/1996 |
| EP | 1182438 | 2/2002 |
| GB | 2358971 | 8/2001 |
| GB | 2404293 | 1/2005 |

OTHER PUBLICATIONS

German Search Report from German Application No. 10 2006 010 107.3.

* cited by examiner

METHOD AND DEVICE FOR IDENTIFYING A TEMPERATURE SENSOR CONNECTED TO A CONTROL UNIT

CROSS REFERENCE TO RELATED APPLICATIONS

This application is a continuation of PCT/EP2007/001652, filed Feb. 27, 2007, which in turn claims priority to DE 10 2006 010 107.3, filed on Mar. 1, 2006, the contents of both of which are incorporated by reference.

FIELD OF THE INVENTION

The invention relates to a method and a device for identifying a temperature sensor connected to a control unit and which is evaluated by said control unit in order to determine a temperature, particularly if the temperature sensor is located in the heat generating area of a heating device.

BACKGROUND OF THE INVENTION

It is known to provide radiant heaters for heating glass ceramic hobs with a temperature limiting device. This leads to the glass ceramic being protected against overheating and the resulting thermal stress breaks. Such a temperature limiting device can either be an electromechanical temperature controller in the form of a so-called rod controller, which brings about the switching off of the heating device of the glass ceramic hob on reaching a preset switching point at a temperature considered to be critical. It is alternatively possible to provide electronic temperature limiting devices with a temperature sensor in the form of a temperature-dependent resistor on the heating device and also an associated electronic limiting unit, particularly a control unit.

The advantage of the second possibility with the temperature sensors is that in addition to the protective function further functions can be implemented, such as for example, a hot display indicator for the glass ceramic hob with adjustable release point, temperature-regulated hotplates or automatic cooking controls, etc. For the temperature sensor itself, use is frequently made of temperature-dependent metal film resistors, particularly platinum resistors, for example so-called PT1000 resistor-temperature sensors. However, these are expensive, and also their maximum use temperature of approximately 750° C. is not adequately high for safe operation, particularly for use on glass ceramic hobs with radiant heaters. Thus, known temperature sensors of this type cannot be placed in the direct action area of radiant heaters and must instead be located in the marginal area or under shielding, etc., but in certain circumstances doing so results in inaccurate measurements.

PROBLEM AND SOLUTION

One problem addressed by the invention is to provide an aforementioned method and a device which can avoid the disadvantages of the prior art and which can provide an alternative to conventional platinum temperature sensors, preferably with a device in which use can be made of different types, forms or groups of temperature sensors.

BRIEF DESCRIPTION OF THE DRAWINGS

An embodiment of the invention is diagrammatically represented in two variants in the drawings and is described in greater detail hereinafter relative to said drawings, wherein.

DETAILED DESCRIPTION OF THE EMBODIMENT

Figure 1:
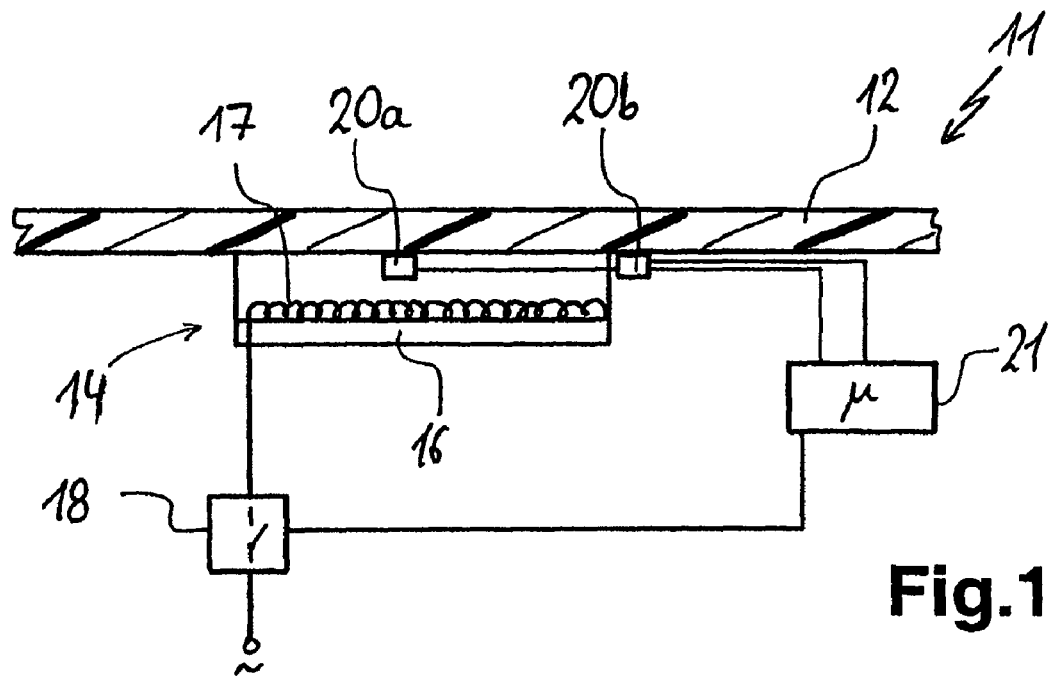
FIG. 1 discloses a side view of a hob with a control unit for performing the inventive method.

Advantageous and preferred developments of the invention form the subject matter of the further claims and are explained in greater detail hereinafter. By express reference the wording of the claims is made into part of the content of the description.

According to one embodiment of the invention, the resistance value of the connected temperature sensor is initially checked or measured on connecting the control unit to the mains or operating voltage, for example, when inserting the mains plug of a corresponding electrical appliance into a socket, In a subsequent or second step, the measured resistance value is compared with at least one preset limit value, preferably with a single preset limit value. The term limit value is here understood to mean a limit value curve having a specific temperature gradient. The limit value curve always passes between the temperature gradients of the resistance values. Through such a limit value it is possible to characterize with respect to the resistance value at least two different groups of temperature sensors. Advantageously, the resistance values of the two groups of temperature sensors are adequately clearly above or below the limit value, so that a distinction can easily be made with confidence and clarity. In a further or third step, the temperature sensor is classified into one of the groups of temperature sensors. If it exceeds the limit value, then it is classified in a first group of temperature sensors. If it drops below the limit value, it is classified in a second group. The temperature sensor which is to be identified does not have a random resistance value and instead emanates from one of the previously known groups of temperature sensors. In a further or fourth step, the control unit modifies the control and/or evaluation of the temperature sensor, as a function of the temperature sensor being classified in one of the groups of temperature sensors, which can also take place as an adaptation in the form of a calibration. Thus, the subsequent evaluation of the temperature sensor by the control unit is not determined by its individually established resistance value, but instead by a value which is characteristic or so-to-speak prototypical for the corresponding group in which the temperature sensor has been classified.

In this way it is possible to reliably and relatively simply classify a temperature sensor which can emanate from two or more groups of temperature sensors, where for each case relatively well known and precisely defined characteristics for each group is known. It is in particular possible to avoid a malfunction of the control unit. Further, where on replacing a defective temperature sensor of one group with another new temperature sensor of the other group, the control unit modifies the control and/or evaluation of the temperature sensor without requiring any additional manual or separate adaptation in the control unit. Such manual adaptation procedures in certain circumstances can be forgotten, which would lead to a malfunction or inaccurate measurement readings.

Advantageously, the resistance value of the temperature sensor on restarting the electrical appliance or the control unit is measured and evaluated in the cold state or at room temperature, particularly prior to the operation of the heating device. As a result of this measurement in the cold state, comparison with the indicated limit values takes place and/or there is a classification in the groups of temperature sensors. This offers the advantage that said cold state normally only has limited fluctuations, so that there is a secure starting basis for the measurements or the comparative measurement.

In another embodiment of the invention, the change to the resistance value on first heating or operating the heating device can be established or evaluated following connection to the mains and the information can be incorporated into the evaluation. Thus, not only is a resistance value measured in the cold state (e.g., room temperature), but also a resistance change. From this, it is possible in certain circumstances to obtain further characteristics for classifying the temperature sensor with one of the groups. Advantageously, the resistance value is first measured and evaluated in the cold state and then the change to the resistance value on heating or operating the heating device is measured and evaluated. This is, in particular, an established process in that either a resistance difference or a specific time difference are defined in order to establish and evaluate the behaviour of the resistance change of the temperature sensor. This also permits an additional control function of the newly introduced temperature sensor or a long used temperature sensor. Said step can be performed, for example, after the aforementioned third step by comparison with the limit value.

A first group of temperature sensors in the cold state can have a resistance value of approximately 1000 Ohms or of this order of magnitude. In particular, these are the aforementioned platinum temperature sensors.

A second group of temperature sensors in the cold state can have a resistance value which is lower by a factor of two to five, for example approximately 300 Ohms. These are advantageously high temperature-resistant temperature sensors, made particularly of tungsten, a tungsten alloy or similar metals.

The heating device is advantageously a radiant heater, particularly of the type used in glass ceramic hobs. This can be either with exposed heating conductors and temperatures of somewhat above 1000° C. or so-called halogen radiant heaters with much higher temperatures.

An aforementioned calibration or identification of the temperature sensor can not only take place following renewed mains connection, but also for example at fixed time intervals. This can either be over the entire life of the electrical appliance or a determined and summated operating period. This makes it possible to detect a gradual deterioration of a temperature sensor so that it can be replaced at an appropriate time.

It is also possible prior to calibration or the aforementioned first step to establish the ambient temperature. This can be accomplished by using a thermistor or the like. This permits an association of the temperature sensor resistance value established on connection to the mains using the established, known ambient temperature. As a result, divergences or other measurement imprecision due to different room temperatures can be compensated.

As an alternative to a calibration in fixed time intervals, calibration can be carried out on each occasion where the control unit or corresponding electrical appliance is separated from the mains and then reconnected. In another embodiment of the invention, calibration can occur on each occasion when the electrical appliance is switched on, the heating device is switched from the cold state, or after a few hours thereafter. This serves to reveal in a timely manner any deterioration of the temperature sensor due to age. It is also possible to establish a new starting point for the temperature sensor characteristic on the basis of its determined resistance value in the cold state on switching on the heating device and to use this information in the control unit for temperature determination. Thus, the control unit knows or it can be programmed to determine how the temperature of the temperature sensor changes on starting up the heating device. Thus, such a characteristic can be stored in the control unit and used for temperature determination. In certain circumstances calibration can not only include the classification of the temperature sensor in one of the indicated temperature sensor groups, but also an adaptation of the characteristics of that group. In particular, with such a characteristic, there is mainly a change to the starting point, so that it only changes through a displacement.

It is also possible to establish sudden changes to the temperature sensor resistance value during heating device operation for monitoring the temperature sensor function, particularly if it passes towards infinity or zero, i.e., an interruption or short-circuit. As these are vital fault cases to detect, and the temperature sensor is looked upon as a very safety-relevant part, this leads to a disconnection of the heating device. There can be a signal output to an operator in association therewith, so that the operator's attention is drawn to the defect. The signal output can take place acoustically and/or optically, advantageously with both methods. Use can be made of signalling means, which can also fulfill other functions or are intended for further signal outputs.

These and further features can be gathered from the claims, description and drawings. Various individual features can be implemented independently or in the form of subcombinations in various embodiments of the invention and in other fields and can represent advantageous, independently protectable constructions for which protection is claimed here. The subdivision of the application into individual sections and the subheadings in no way limit the general validity of the statements made thereunder.

FIG. 1 shows a hob 11 with a hob plate 12, beneath which is located a conventional radiant heater 14 as the heating device. The latter is provided on an insulating material support 16 with a heating conductor 17, for example in the form of an upright, coiled flat strip. The radiant heater 14 is controlled by means of a switch 18, for example a relay. It is inter alia possible for this function to be fulfilled by the control unit 21 which may include a processor, or alternatively electromechanical controllers.

In the upper area of the radiant heater 14 are shown two alternatively usable temperature sensors 20a and 20b. Temperature sensor 20a is in the direct influence area or heating area of radiant heater 14 and heating conductor 17. It is therefore exposed to temperatures of max approximately 1000° C. and normally somewhat below this level. Its temperature identification action can either be directed downwards towards the heating conductor 17, or alternatively it can determine on its top side, preferably with downward shielding, mainly the temperature of the hob plate 12 or its underside. This serves to protect the hob plate 12 against damage through excessive temperatures resulting from the radiant heater 14. This is a problem known to the expert in the field of hobs, particularly glass ceramic hob plates. The presently described and represented temperature sensors 20 are intended to replace the otherwise used, electromechanical temperature determination devices, so-called rod controllers.

Temperature sensor 20b is positioned outside the radiant heater 14. It can also be used for determining the temperature of the hob plate 12 or its underside. It can alternatively determine and monitor the ambient temperature. In a further development of the invention there are additional possibilities for placing a corresponding temperature sensor. It is in particular possible to provide several such temperature sensors on a radiant heater.

Temperature sensors 20a and 20b are constructed as electrical resistors and have an electrical resistance. They are connected to the control unit 21, which controls or evaluates the resistors for temperature determination purposes. As shown, control unit 21 can also be connected to switch 18. It can either activate it or at least determine its activation state, which is advantageous for temperature evaluation and particularly for monitoring the temperature sensor 20.

Figure 2:
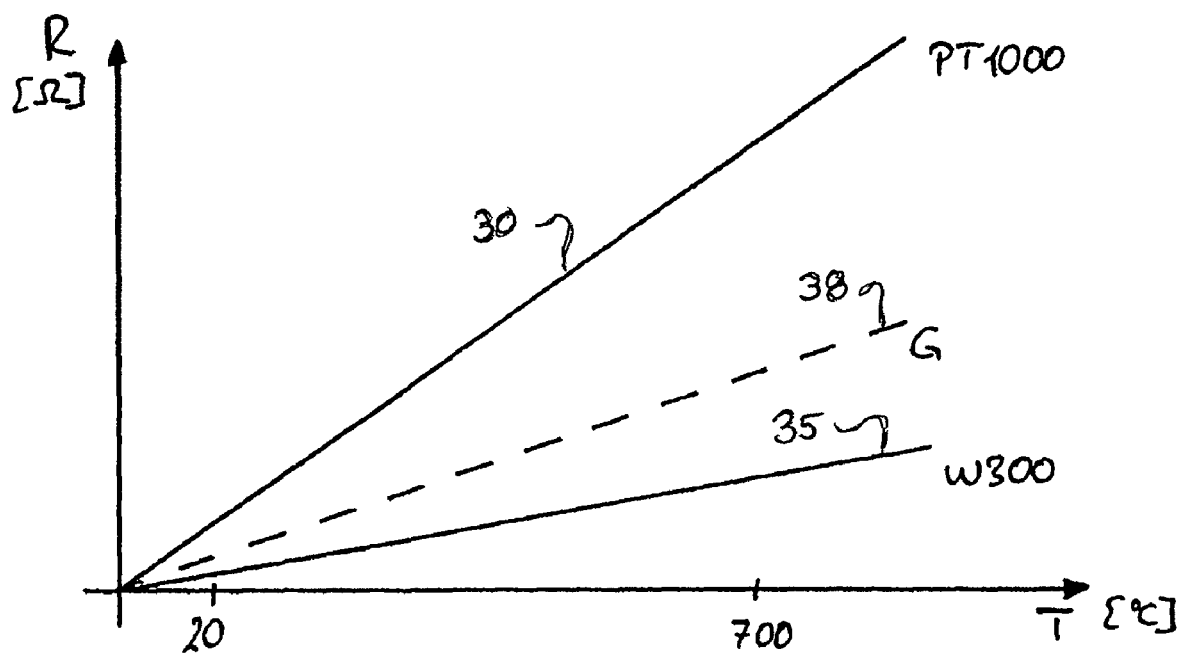
FIG. 2 discloses different curves of the electrical resistance over temperature for classifying a temperature sensor in a particular group.

FIG. 2 plots two typical resistance curves over temperature. On the one hand there is a curve 30 for a so-called PT1000 resistor, which is of the type frequently conventionally used for temperature measurements. It is characterized by high linearity of its gradient. The further curve shows a tungsten or tungsten alloy temperature sensor, which can be sealed in gas-tight manner, for example in a quartz glass tube. The advantage of a tungsten temperature sensor is that, compared with the maximum use temperature of platinum measuring resistors accompanied by acceptable costs and at approximately 750° C. is able to withstand a much higher temperature, for example up to 900° C. This permits problem-free use over a radiant heater and also the prime costs are lower.

As the curve 35 of the resistance over the temperature in the case of a tungsten sensor, for example a W300 sensor, differs significantly from a PT1000 platinum sensor, this naturally has significant effects for the temperature determination. To ensure that on replacing a defective temperature sensor use is not made of the incorrect temperature sensor type, for example a tungsten temperature sensor in place of a platinum temperature sensor, there is a subdivision into different or two groups of temperature sensors. This function is shown by the broken line 38 indicated limit value or limit value curve G. It can be, for example, in the centre of the two temperature sensor curves and in general is simply between them. Even at room temperature, there is a difference in the initial resistances of the two groups or one is above and the other below the corresponding limit value. This allows the first possibility of classifying an installed temperature sensor, for example, if it is replaced in the case of a repair.

In another embodiment of the invention, the control unit is adapted to the identified temperature sensor as a function of its identification. Thus, the control unit does not make use for calibration purposes of the individual characteristics of the temperature sensor used and instead, on the basis of its individual characteristics, determines its association with one of the groups. It then uses as a basis the stored characteristics of this group. In another embodiment further development of the invention it is also possible to carry out a further measurement after heating or operation of the radiant heater. This operational information can be provided to control unit 21 via the connection to switch 18. In another embodiment of the invention, it is possible to assume certain, clearly defined states in heating operation and to monitor the corresponding behaviour of the temperature sensor, whilst also performing a further calibration or in certain circumstances giving an error message, if there is a particular or excessive divergence of the temperature sensor. One embodiment of the invention is to ensure that the control unit automatically identifies which one of two groups the temperature sensor is from so that the controller can adjust thereto.

The above-described possibility of establishing the ambient temperature on starting the first temperature measurement using a thermistor is well known and not further expressly described here and the thermistor is not expressly shown. However, the thermistor can be located at a random point, particularly near to the control unit 21, which can be readily implemented by the expert.

During the operation of the radiant heater 14 control unit 21 determines the temperature by means of temperature sensor 20a or 20b. It is advantageous if on establishing a clear temperature jump in the form of a rise or fall, a fault case can be established with a corresponding response of the control unit, particularly with a warning signal and an immediate disconnection of the radiant heater 14.

The invention claimed is:

1. A method for identifying a temperature sensor of a heating device, wherein said temperature sensor is positioned so as to be directly heated by said heating device, wherein said temperature sensor is connected to a control unit and evaluated by said control unit, comprising the steps of:
    measuring a resistance value of said connected temperature sensor in response to connecting said control unit to an operating voltage;
    comparing said resistance value with at least one preset limit value, wherein said preset limit value characterizes at least two different groups of temperature sensors with respect to said resistance value of said at least two different groups of temperature sensors;
    classifying said temperature sensor as belonging to a first group of temperature sensors if said resistance value exceeds said limit value and
    classifying said temperature sensor as belonging to a second group of temperature sensors if said resistance value is below said limit value; and
    controlling and evaluating said temperature sensor by said control unit by using calibration data to calibrate said temperature sensor using said resistance value according to one of said groups of said temperature sensors.

2. The method according to claim 1, wherein measuring said resistance value of said temperature sensor is evaluated prior to activating the heating device and at room temperature.

3. The method according to claim 1, wherein a Change to said resistance value on a first heating of said heating device following connection to said operating voltage is detected and is incorporated into said evaluation, wherein firstly said resistance value is measured and evaluated when said heating device is at room temperature prior to said first heating and then a Change to said resistance value is measured and evaluated after heating said heating device, wherein said Change is a Change based on a specific resistance difference or a Change based on a specific time difference.

4. The method according to claim 1, wherein said heating device is a radiant heater.

5. The method according to claim 1, wherein said calibration takes place following a fixed time interval.

6. The method according to claim 1, wherein said calibration occurs after said control unit is reconnected to said operating voltage after being separated from said operating voltage.

7. The method according to claim 1, wherein prior to calibration or said first step an ambient temperature is measured using a thermistor, wherein said resistance value of said temperature sensor is determined on connection to said operating voltage and is classified into one of said groups of said temperature sensors as a function of said measured ambient temperature.

8. The method according to claim 1, wherein faster than normal Changes of said resistance value of said temperature sensor during operation of said temperature sensor towards either infinity or zero are evaluated as indicative of a defective temperature sensor and lead to a disconnection of power to said heating device.

9. The method according to claim 1, wherein said first group of said temperature sensors has a resistance value at room temperature of approximately 1000 Ohms.

10. The method according to claim 9, wherein said first group of said temperature sensors comprises platinum temperature sensors.

11. The method according to claim 1, wherein said second group of said temperature sensors has a resistance value at room temperature of approximately 300 Ohms.

12. The method according to claim 11, wherein said second group of said temperature sensors comprises high temperature-resistant temperature sensors made of tungsten or tungsten alloy.

13. The method according to claim 1, wherein calibration occurs after said heating device has been switched off for at least six hours or said temperature sensors have reached a room temperature state and a new starting point for a characteristic of the temperature sensor is determined in a control unit when the heating device is switched on and by means of which temperature determination takes place in said control unit.

14. The method according to claim 13, wherein on switching on said heating device a new starting point for said characteristic of said temperature sensor is determined in said control unit, wherein by means of said characteristic said temperature determination takes place in said control unit.

* * * * *